US007680061B2

(12) United States Patent
Michel et al.

(10) Patent No.: US 7,680,061 B2
(45) Date of Patent: Mar. 16, 2010

(54) METHOD AND SYSTEM WHICH APPLY HEURISTICS TO IDENTIFY SIGNALS ACCESSIBLE TO SUBSCRIBERS IN HYBRID FIBER COAXIAL (HFC) INTERACTIVE NETWORKS

(75) Inventors: Walter F. Michel, Glenside, PA (US); Michael A. Chen, Wallingford, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1369 days.

(21) Appl. No.: 11/100,881

(22) Filed: Apr. 7, 2005

(65) Prior Publication Data

US 2006/0227722 A1    Oct. 12, 2006

(51) Int. Cl.
*G01R 31/08*   (2006.01)
*H04L 12/28*   (2006.01)
*H04N 7/16*    (2006.01)
*H04N 7/173*   (2006.01)

(52) U.S. Cl. .................. 370/252; 370/431; 725/25; 725/114

(58) Field of Classification Search .............. 370/248, 370/252, 431, 463, 437; 725/25, 118, 114, 725/116, 117, 120, 138, 144, 146
See application file for complete search history.

(56) References Cited

U.S. PATENT DOCUMENTS 4,999,833 A * 3/1991 Lee ........................ 370/312
5,576,755 A * 11/1996 Davis et al. .............. 725/48
5,826,166 A   10/1998 Brooks et al.
6,069,885 A   5/2000 Fong et al.
6,781,982 B1   8/2004 Borella et al.
6,850,533 B2   2/2005 Gerszberg et al.
2002/0111154 A1   8/2002 Eldering et al.
2004/0001581 A1   1/2004 Chen et al.

OTHER PUBLICATIONS

International Search Report for corresponding International Application No. PCT/US06/10675, mailed Mar. 29, 2007, 2 pages.

* cited by examiner

*Primary Examiner*—Nittaya Juntima
(74) *Attorney, Agent, or Firm*—Banner & Witcoff, Ltd.

(57) ABSTRACT

A system and method for identifying which signals provided by a head-end are accessible to CPE of a subscriber in an HFC network. The method includes obtaining a partial list of signals accessible to the CPE, and then applying heuristic rules on the partial list to generate a complete accessible signal list. Obtaining the partial list includes discovering signal information regarding a subset of the signals which are accessible to the CPE; using the discovered signal information to obtain a signal identification of a signal accessible to the CPE; and generating the partial list based on the obtained signal identification. Applying a heuristic rule includes using a bit mask within the obtained signal identification or a naming convention of the obtained signal identification to identify other associated signals. The partial list is then generated based on the obtained signal identification and the signal identifications of the other associated signals.

20 Claims, 2 Drawing Sheets

METHOD AND SYSTEM WHICH APPLY HEURISTICS TO IDENTIFY SIGNALS ACCESSIBLE TO SUBSCRIBERS IN HYBRID FIBER COAXIAL (HFC) INTERACTIVE NETWORKS

BACKGROUND OF THE INVENTION

1. Field of the Invention

The present invention relates to identifying signals accessible to subscribers in hybrid fiber coaxial (HFC) interactive networks.

2. Background Art

A hybrid fiber coaxial (HFC) network is a telecommunications network in which optical fiber and coaxial cable are used in different portions of the network. The fiber and cable along with other HFC equipment make up the "plant" of the HFC network. An HFC network connects a head end (HE) to subscribers for the HE to communicate broadband content (such as video, data, and voice) to the subscribers. The fiber portion of the plant is generally connected to the HE whereas the cable portion of the plant is generally connected to the subscribers. An interactive HFC network provides two-way communications between the HE and the subscribers such that the subscribers are enabled to transmit information to the HE.

A subscriber has customer premises equipment (CPE) such as a set-top-box (STB) which connects the subscriber to the HFC interactive network. The CPE receives broadband signals transmitted by the HE. Typically, a single HE serves a plurality of subscribers and subsets of the subscribers are arranged in different subscriber service groups. In general, the HE provides a multitude of broadband signals for the subscribers. Typically, however, all of the signals are not available or accessible by all of the subscribers. For instance, a set of some of the signals are accessible to the subscribers in one service group whereas a different set of some of the signals are accessible to the subscribers in a different service group.

That is, in an HFC interactive network, the CPE of a subscriber can connect to a multitude of signals that have varying degrees of uniqueness within the network. As such, certain ones of the signals are available or accessible to select service groups. Some signals may appear in only one service group whereas other signals may appear in many different or all of the service groups.

Enabling the HE to determine the set of signals a particular subscriber can access is difficult for many reasons. One reason is that the plant of the HFC interactive network is continuously changing. Another reason is that the CPE often has no mechanism to determine the difference between the signals. If the CPE of a subscriber does have such capabilities, then often these capabilities are limited to discovering only a few of the multitude of signals. Lastly, communications bandwidth is a scarce resource and requiring the CPE to send information regarding all signals accessible to the HE is too burdensome.

To date, most discovery mechanisms either require a full discovery of all signals or require a limited discovery of one piece of information found in either data within a single signal or data related to upstream communication paths. The latter method also requires that an operator manually create a table mapping each signal to the grouping of subscribers served by those signals. The discovered data is an index to the table.

A challenge with the full discovery method is that limited communications bandwidth limits the scalability of this method. In other words, as the number of signals used for interactivity grows, the ability to send all of the information to the HE diminishes. Also, the time in which it takes to discover the information increases. Usually there is no time at which the CPE is not in use. Therefore, the amount of time spent searching for signals is often limited. In any event, systems that rely solely on full discovery are typically provide only a limited set of the available signals to the HE.

A challenge with the limited discovery method is that the manual mapping requires much time and effort to maintain. Often the plant of an HFC interactive network changes and the changes may not be reflected in the mapping, thus causing denial of service to the subscribers. Also, mis-configurations sometimes occur which require much effort to fix. These mis-configurations are typically only uncovered after a subscriber has lost service.

SUMMARY OF THE INVENTION

Accordingly, it is an object of the present invention to provide a method and system which apply heuristics to identify signals accessible to subscribers in hybrid fiber coaxial (HFC) interactive networks.

It is another object of the present invention to provide an architecture and an algorithm that allow head end (HE) equipment to determine the signals to which a customer premises equipment (CPE) of a subscriber has access by using heuristics or intelligent approximations.

It is a further object of the present invention to provide a method and system which apply heuristics to identify signals accessible to subscribers in HFC interactive networks in which the heuristics are algorithmic and do not require specific knowledge of any signals or mapping of signals to be known in advance.

It is still another object of the present invention to provide a method and system which determine, with a minimum of operator involvement, the signals accessible to a CPE of a subscriber in an HFC interactive network.

In carrying out the above objects and other objects, the present invention provides a method for identifying which signals provided by a HE are accessible to a CPE of a subscriber in a hybrid fiber coaxial network. The method includes obtaining a partial list of signals accessible to the CPE, and then applying one or more heuristic rules on the partial accessible signal list in order to generate a complete list of signals accessible to the CPE. Obtaining the partial accessible signal list generally includes discovering signal information regarding a subset of the signals which are accessible to the CPE. The discovered signal information is then used to obtain a signal identification of at least one signal accessible to the CPE. The partial list of accessible signals is then generated based on the obtained signal identification of the at least one signal accessible to the CPE.

Known transmission frequency characteristics regarding the subset of signals which are accessible to the CPE may be used in order to obtain the discovered signal information. Using the discovered signal information in order to obtain a signal identification of at least one signal accessible to the CPE may include mapping the discovered signal information to the signal identification of the at least one signal accessible to the CPE. The discovered signal information may either contain the signal identification of the at least one signal accessible to the CPE or contain information that allows creation of the signal identification of the at least one signal accessible to the CPE.

The method may further include finding any signals provided from the HE which the HE has co-located with the at least one signal accessible to the CPE. Any signal co-located with the at least one signal accessible to the CPE is also accessible to the CPE. In this case, generating the partial list of accessible signals may be based on the obtained signal identification of the at least one signal accessible to the CPE and any signals co-located with the at least one signal accessible to the CPE.

Applying a heuristic rule on the partial list of accessible signals may include using a bit mask within the signal identification of the at least one signal accessible to the CPE to identify signal identifications of other signals which are associated with the signal identification of the at least one signal accessible to the CPE. Applying a heuristic rule on the partial list of accessible signals may additionally or alternatively include using a naming convention of the signal identification of the at least one signal accessible to the CPE to identify signal identifications of other signals which are associated with the signal identification of the at least one signal accessible to the CPE. In either case, generating the partial list of accessible signals may be based on the obtained signal identification of the at least one signal accessible to the CPE and the signal identifications of the other signals which are associated with the signal identification of the at least one signal accessible to the CPE. The partial list of accessible signals may further be generated based on any signals co-located with the at least one signal accessible to the CPE.

Applying a heuristics rule on the partial list of accessible signals may additionally or alternatively include determining whether any other signal accessible to the CPE from a device other than the HE has the same signal identification as the signal identification of the at least one signal accessible to the CPE in order to identify signal identifications of other signals which have the same signal identification as the at least one signal accessible to the CPE. In this case, generating the partial list of accessible signals may be based on the obtained signal identification of the at least one signal accessible to the CPE and the obtained signal identification of the other signals which have the same signal identification as the at least one signal accessible to the CPE.

Obtaining a partial list of accessible signals may include obtaining a previously created complete list of signals accessible to the CPE in order to generate the partial list of accessible signals.

The method may further include identifying other CPE of the subscriber; and then associating the complete list of signals accessible to the CPE with the other CPE in order to generate a super-set listing of the signals accessible to each CPE.

Further, in carrying out the above objects and other objects, the present invention provides an associated system for identifying which subset of signals provided by a HE are accessible to a CPE of a subscriber in an HFC network. The associated system generally includes a heuristics engine operable to obtain a partial list of signals accessible to the CPE. The heuristics engine is operable to apply one or more heuristic rules on the partial list of signals accessible to the CPE in order to generate a complete list of signals accessible to the CPE.

The advantages associated with the present invention are numerous. For instance, by applying heuristics on data seen by a CPE of a subscriber and without requiring manual mapping, the operational burden for maintaining an HFC interactive network is greatly reduced and the subscriber experience is not impacted negatively.

DETAILED DESCRIPTION OF THE PREFERRED EMBODIMENT(S)

Figure 1:
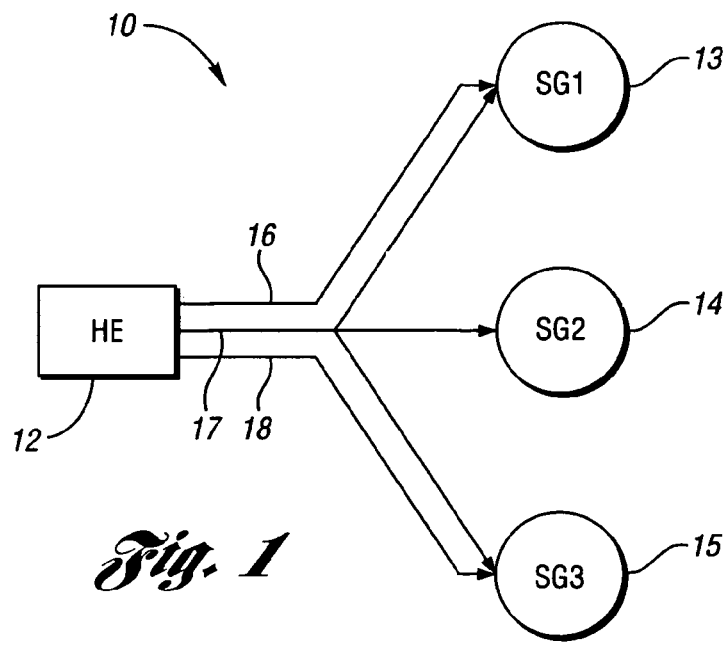
FIG. 1 illustrates a hybrid fiber coaxial (HFC) interactive network in accordance with the present invention.

Referring now to FIG. 1, a hybrid fiber coaxial (HFC) interactive network 10 in accordance with the present invention is shown. HFC interactive network 10 includes a head-end (HE) 12 which is connected by the plant of the HFC interactive network (not shown) to a plurality of subscriber service groups. The service groups include first service group 13, second service group 14, and third service group 15. Each service group 13, 14, 15 includes their own set of subscribers (i.e., customers). The subscribers of a service group are located in their own respective premises (i.e., customer premises).

As shown in FIG. 1, HE 12 is the source of three different and unique signals. These signals include first signal 16, second signal 17, and third signal 18. First and second signals 16, 17 are accessible to the subscribers of first service group 13. Second signal 17 is accessible to the subscribers of second service group 14. Second and third signals 17, 18 are accessible to the subscribers of third service group 15.

Second signal 17 is a shared signal as it is accessible by all three service groups 13, 14, 15. As such, second signal 17 is a broadcast signal. First and third signals 16, 18 are not accessible to all three service groups 13, 14, 15. As such, first and third signals 16, 18 are narrowcast signals. First and third signals 16, 18 are narrowcast signals because they only reach a subset of service groups 13, 14, 15 as first signal 16 is only accessible to first service group 13 and third signal 18 is only accessible to third service group 15.

As indicated above, there are subscribers in each service group 13, 14, 15. The subscribers in a service group have equal access to the signals available to the service group. For example, the subscribers in first service group 13 have equal access to first and second signals 16, 17. However, it is not necessarily so that all of the subscribers in a service group can acquire the signals accessible to the service group. This is because signal attenuation often causes signals accessible to the subscribers in a service group to be blocked to certain ones of the subscribers in the service group.

It is often the case that narrowcast signals, while carrying different sets of data, share certain characteristics such as transmission frequency. For instance, a CPE of a subscriber in first service group 13 can tune to a given frequency and receive first signal 16 while the same CPE placed in third service group 15 and tuned to the same given frequency would receive third signal 18.

Figure 2:
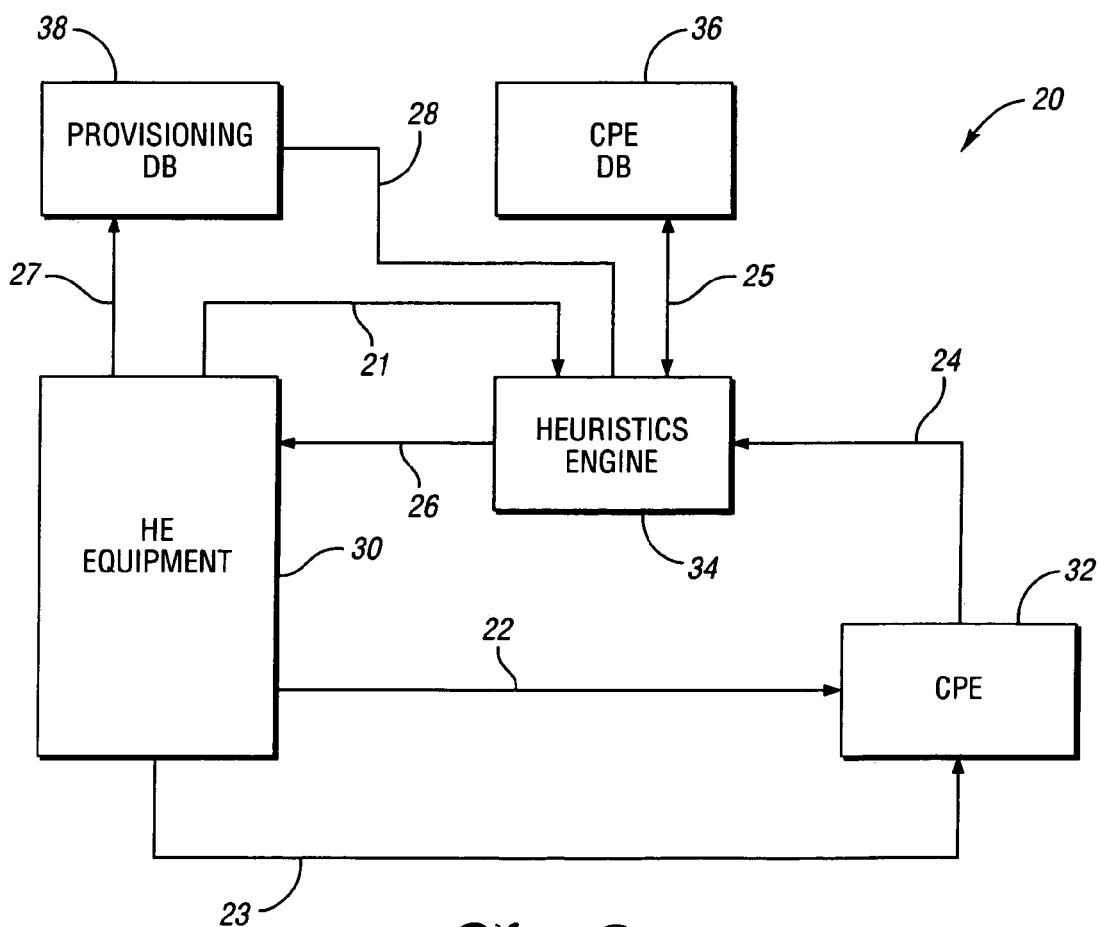
FIG. 2 illustrates an architecture of an HFC interactive network in accordance with the present invention.

Referring now to FIG. 2, with continual reference to FIG. 1, an architecture 20 for an HFC interactive network in accordance with the present invention is shown. In architecture 20, head-end (HE) equipment 30 is provisioned to provide signals to the plant of the HFC interactive network for receipt by the subscribers. Each signal provided by HE equipment 30 has its own unique signal identification (ID). HE equipment 30 is then physically connected to the plant of the HFC interactive network. This allows a CPE 32 of a given subscriber in a given service group to gain access to the signals provided by HE equipment 30 through a communications line 23 connecting the CPE of the given subscriber to the HE equipment.

The signals provided by HE equipment 30 through communications line 23 for receipt by CPE 32 of the given subscriber are only a subset of all the signals provided by the HE equipment to the plant. That is, CPE 32 of the given subscriber has access to a subset of all of the signals provided by HE equipment 30 to the plant whereas a CPE of another subscriber located in a different service group has access to a different subset of all of the signals provided by the HE equipment to the plant.

HE equipment 30 provides information regarding the physical connection of communications line 23 between the HE equipment and CPE 32 to a heuristics engine 34. HE equipment 30 provides this information to heuristics engine 34 via a communications line 21 connected between the HE equipment and the heuristics engine. It is noted that HE equipment 30 and heuristics engine 34 may be components of the HE.

In certain cases, HE equipment 30 physically co-locates signals. This means that a physical output port of HE equipment 30 may contain two or more independent signals. All signals within the same physical output port are available to the same destinations. HE equipment 30 autonomously delivers to heuristics engine 34, via communications line 21, information regarding the physical mapping of the output ports of the HE equipment which have co-located signals.

HE equipment 30 advises CPE 32 of where to look for the signals transmitted from the HE equipment through communications line 23 to the CPE. That is, HE equipment 30 advises CPE 32 of which transmission frequencies to look for the signals transmitted by the HE equipment through communications line 23 to the CPE. HE equipment 30 advises CPE 32 of these transmission frequencies via a communications line 22 connected between the HE equipment and the CPE.

Either during background processing when CPE 32 is not in use, during its initialization, or at the beginning of an interactive session, the CPE uses the transmission frequency information to discover information about a subset of the signals transmitted through communications line 23. That is, CPE 32 uses the transmission frequency information provided by HE equipment 30 to discover signal information regarding a subset of the signals transmitted by the HE equipment to the CPE via communications line 23. The subset of signals is just one or a handful of all the signals transmitted by HE equipment 30 to CPE 32 via communications line 23. Again, all of the signals transmitted by HE equipment 30 to CPE 32 via communications line 23 is also just a subset of all of the signals provided by the HE equipment to all of the subscribers as a whole.

Thus, the discovered signal information is information discovered by CPE 32 about some of the signals provided by HE equipment 30 to the CPE via communications line 23. CPE 32 delivers all or part of the discovered signal information to heuristics engine 34 via a communications line 24. CPE 32 delivers this discovered signal information to heuristics engine 34 either prior to an interactive session or at the request for an interactive session.

When the subscriber requests an interactive session, CPE 32 sends a message to heuristics engine 34 via communications line 24. The message includes all or part of the discovered signal information and also includes an interactive session startup request or the like. In response to receiving the message, heuristics engine 34 applies an algorithm in accordance with the present invention to the discovered signal information provided by CPE 32 in order to either create or expand/update a list of signals available to the CPE. That is, heuristics engine 34 applies the algorithm on the discovered signal information provided by CPE 32 to generate a list of all signals which are accessible to the CPE. Heuristics engine 34 then forwards the startup request and the list of accessible signals to HE equipment 30 via a communications line 26. Upon receipt of the list of accessible signals, HE equipment 30 is aware of the signals provided by the HE equipment which are accessible to CPE 32.

The details of the algorithm applied by heuristics engine 34 on the discovered signal information provided by CPE 32 will be described in further detail below with respect to FIG. 3. For now it is noted that, as described above, heuristics engine 34 applies the algorithm on the discovered signal information to determine the signals provided by HE equipment 30 which are available to the CPE. In determining this list of accessible signals, heuristics engine 34 may confer with a CPE database 36 to determine whether a list of accessible signals has already been generated for CPE 32. If a list of accessible signals has already been generated for CPE 32, then heuristics engine 34 applies the algorithm on the discovered signal information to expand or update this accessible signal list. If CPE database 36 is void of available signal information regarding CPE 32 or if it appears that such information has been changed, then heuristics engine 34 creates the data (i.e., the list of signals available to CPE 32), stores this newly created available signal list in CPE database 36, and then passes along this newly created available signal list to HE equipment 30 via communications line 26.

There are logical equivalents to the above-described operations between the elements of architecture 20 of the HFC interactive network. For example, CPE 32 may send the discovered signal information to heuristics engine 34 prior to an interactive session. CPE 32 may then send the interactive session startup request directly to HE equipment 30. In turn, HE equipment 30 requests the accessible signal list for CPE 32 from heuristics engine 34.

As another example, CPE 32 may send only the interactive session startup request with the discovered signal information to HE equipment 30. In turn, HE equipment 30 queries heuristics engine 34 with the discovered signal information in order to obtain from the heuristics engine the accessible signal list for CPE 32. As another example, HE equipment 30 may query CPE database 36 directly, but unbeknownst to the HE equipment, the query may result in the CPE database calling out to heuristics engine 34.

When CPE systems such as CPE 32 are (de-)provisioned by a subscriber management system in the HE, it is possible that the information within the transaction is captured and placed by HE equipment 30 into a provisioning database 38. HE equipment 30 populates provisioning database 38 with the captured transaction information via communications line 27. Among other things, provisioning database 38 can map various CPE devices in a customers premise. In other words, if a subscriber has many CPE devices in its premise, it is likely that each CPE device has access to the same set of signals. Provisioning database 38 allows heuristics engine 34 to determine such associations using the captured transaction information. Heuristics engine 34 queries provisioning database 38 via communications line 28 to access the captured transaction information.

Figure 3:
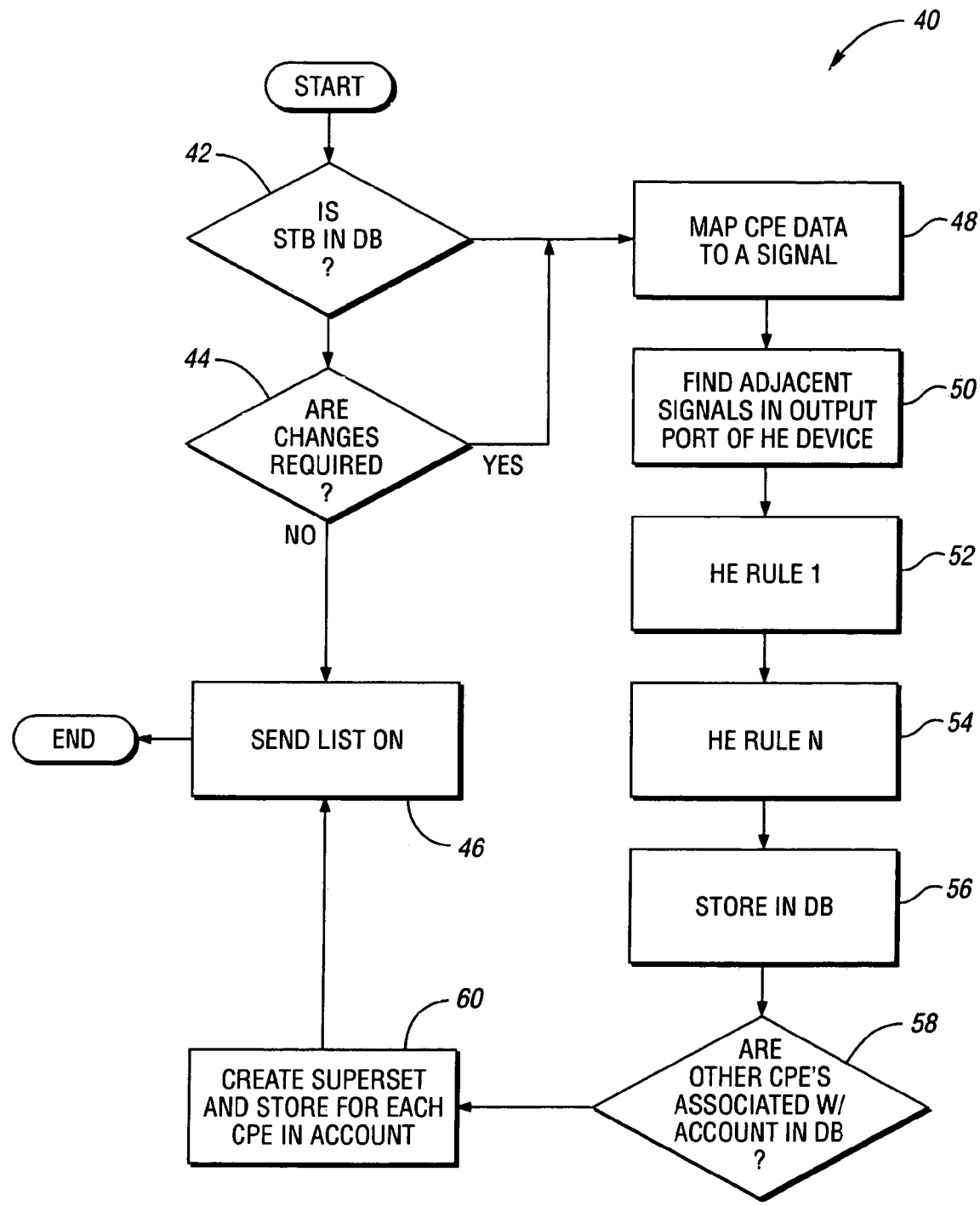
FIG. 3 illustrates an algorithm applied by the heuristics engine of the HFC interactive network shown in FIG. 2 in accordance with the present invention.

Referring now to FIG. 3, with continual reference to FIGS. 1 and 2, an algorithm 40 applied by heuristics engine 34 in order to determine the signals available to CPE 32 in accordance with the present invention is shown. Algorithm 40 as shown in FIG. 3 represents a basic algorithm applied by heuristics engine 34 on the discovered signal information provided by CPE 32 for the heuristics engine to either create or expand/update a list of signals available to the CPE.

In operation, when a request arrives, heuristics engine 34 first checks to see if any information (i.e., a previously created list of accessible signals) for CPE 32 already exists in CPE database 36 as shown by decision block 42. If CPE database 36 has a stored previously created list of available signals for CPE 32, then heuristics engine 34 checks to see whether any modifications need to be made to the previously created accessible signal list as shown in decision block 44. Heuristics engine 34 may determine that modifications are required because the previously created accessible signal list is too old to rely on or because data in the message (i.e., the discovered signal information) indicates that the previously created heuristically derived accessible signal list is based on data that has changed. The message could indicate that data needs to be added to the information stored in CPE database 36, i.e., CPE 32 has uncovered more accessible signals.

If heuristics engine 34 determines that no changes are required to the previously created accessible signal list, then the heuristics engine puts all the information from CPE database 36 into the startup request and forwards a message including the startup request and the previously created list of accessible signals to HE equipment 30 as shown by block 46.

If heuristics engine 34 determines that changes to the previously created accessible signal list for CPE 32 are required or that there is no signal list information in CPE database 36 for the CPE, then the heuristics engine begins processing data within the message provided by the CPE. First, heuristics engine 34 attempts to map the discovered signal information provided by CPE 32 to a signal ID(s) as shown by block 48. The discovered signal information may contain a signal ID(s) or information that allows the creation of a signal ID(s). After a signal ID(s) is obtained or derived, heuristics engine 34 attempts to find any co-located signals within the physical output ports of HE equipment 30 as shown by block 50. At this point, heuristics engine 34 uses the signal ID(s) and the co-located signal information to derive a partial list of signals accessible to CPE 32.

Heuristics engine 34 then applies a variety of heuristics rules to the partial list of accessible signals as shown by blocks 52, 54 in order to generate a complete list of signals accessible to CPE 32. There are many types of heuristics rules which can be applied by heuristics engine 34. As an example, a bit mask within a signal ID could be used to show association with other signal IDs. For instance, this could include encoding a service group ID into the signal ID. As another example, a naming convention of a signal ID could be used to show association with other signal IDs. For instance, a signal having signal ID "N" and a signal having signal ID "N+1" are usually sent to the same service group. As another example, a signal ID could be identical to a signal ID on another device feeding CPE 32. For instance, two signals carried on different frequencies contain the same signal ID. In this case, heuristics engine 34 looks up the identical signal IDs.

After applying the heuristics rules on the partial list of accessible signals in order to generate the complete list of signals accessible to CPE 32, heuristics engine 34 provides the complete list of accessible signals to CPE database 36 as shown by block 56. Heuristics engine 34 then checks CPE database 36 to see if other CPE devices are associated with the subscriber as shown by decision block 58. If other CPE devices are associated with the subscriber, then heuristics engine 34 looks up the identities of those CPE devices in CPE database 36. Heuristics engine 34 then creates a super-set of all the signal IDs seen by all the CPE devices of the subscriber and commits them to CPE database 36 for each CPE device as shown by block 60. Heuristics engine 34 then appends the complete list of signal IDs (i.e., the complete list of signals accessible to CPE 32) to a message having the interactive session startup request and then forwards this message to HE equipment 30 as shown by block 46.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for identifying which signals provided by a head-end are accessible to a customer premise equipment (CPE) of a subscriber in a hybrid fiber coaxial network, the method comprising:
   obtaining, by a heuristics engine, a partial list of signals accessible to the CPE; and
   applying one or more heuristic rules on the partial list of accessible signals in order to generate a complete list of signals accessible to the CPE;
   wherein obtaining, by a heuristics engine, the partial list of accessible signals comprises:
   discovering signal information regarding a subset of the signals which are accessible to the CPE;
   using the discovered signal information to obtain a signal identification of at least one signal accessible to the CPE; and
   generating the partial list of accessible signals based on the obtained signal identification of the at least one signal accessible to the CPE.

2. The method of claim 1 wherein discovering signal information regarding a subset of the signals which are accessible to the CPE comprises:
   using known transmission frequency characteristics regarding the subset of signals which are accessible to the CPE in order to obtain the discovered signal information.

3. The method of claim 1 wherein using the discovered signal information in order to obtain a signal identification of at least one signal accessible to the CPE comprises:
   mapping the discovered signal information to the signal identification of the at least one signal accessible to the CPE.

4. The method of claim 3 wherein:
   the discovered signal information either contains the signal identification of the at least one signal accessible to the CPE or contains information that allows creation of the signal identification of the at least one signal accessible to the CPE.

5. The method of claim 1 further comprising:
   finding any signals provided from the head-end which the head-end has co-located with the at least one signal accessible to the CPE, wherein any signal co-located with the at least one signal accessible to the CPE is also accessible to the CPE;
   wherein generating the partial list of accessible signals is based on the obtained signal identification of the at least one signal accessible to the CPE and any signals co-located with the at least one signal accessible to the CPE.

6. The method of claim 5 wherein applying a heuristic rule on the partial list of accessible signals comprises:
   using a bit mask within the signal identification of the at least one signal accessible to the CPE to identify signal identifications of other signals which are associated with the signal identification of the at least one signal accessible to the CPE;
   wherein generating the partial list of accessible signals is based on the obtained signal identification of the at least one signal accessible to the CPE, any signals co-located with the at least one signal accessible to the CPE, and the signal identifications of the other signals which are associated with the signal identification of the at least one signal accessible to the CPE.

7. The method of claim 5 wherein applying a heuristic rule on the partial list of accessible signals comprises:
   using a naming convention of the signal identification of the at least one signal accessible to the CPE to identify signal identifications of other signals which are associated with the signal identification of the at least one signal accessible to the CPE;
   wherein generating the partial list of accessible signals is based on the obtained signal identification of the at least one signal accessible to the CPE, any signals co-located with the at least one signal accessible to the CPE, and the signal identifications of the other signals which are associated with the signal identification of the at least one signal accessible to the CPE.

8. The method of claim 5 wherein applying a heuristic rule on the partial list of accessible signals comprises:
   determining whether any other signal accessible to the CPE from a device other than the head-end has the same signal identification as the signal identification of the at least one signal accessible to the CPE in order to identify signal identifications of other signals which have the same signal identification as the at least one signal accessible to the CPE;
   wherein generating the partial list of accessible signals is based on the obtained signal identification of the at least one signal accessible to the CPE, any signals co-located with the at least one signal accessible to the CPE, and the obtained signal identification of the other signals which have the same signal identification as the at least one signal accessible to the CPE.

9. The method of claim 1 wherein applying a heuristic rule on the partial list of accessible signals comprises:
   using a bit mask within the signal identification of the at least one signal accessible to the CPE to identify signal identifications of other signals which are associated with the signal identification of the at least one signal accessible to the CPE;
   wherein generating the partial list of accessible signals is based on the obtained signal identification of the at least one signal accessible to the CPE and the signal identifications of the other signals which are associated with the signal identification of the at least one signal accessible to the CPE.

10. The method of claim 1 wherein applying a heuristic rule on the partial list of accessible signals comprises:
    using a naming convention of the signal identification of the at least one signal accessible to the CPE to identify signal identifications of other signals which are associated with the signal identification of the at least one signal accessible to the CPE;
    wherein generating the partial list of accessible signals is based on the obtained signal identification of the at least one signal accessible to the CPE and the signal identifications of the other signals which are associated with the signal identification of the at least one signal accessible to the CPE.

11. The method of claim 1 wherein applying a heuristic rule on the partial list of accessible signals comprises:
    determining whether any other signal accessible to the CPE from a device other than the head-end has the same signal identification as the signal identification of the at least one signal accessible to the CPE in order to identify the signal identifications of other signals which have the same signal identification as the at least one signal accessible to the CPE;
    wherein generating the partial list of accessible signals is based on the obtained signal identification of the at least one signal accessible to the CPE and the obtained signal identification of the other signals which have the same signal identification as the at least one signal accessible to the CPE.

12. A method for identifying which signals provided by a head-end are accessible to a customer premise equipment (CPE) of a subscriber in a hybrid fiber coaxial network, the method comprising:
    obtaining, by a heuristics engine, a partial list of signals accessible to the CPE; and
    applying one or more heuristic rules on the partial list of accessible signals in order to generate a complete list of signals accessible to the CPE;
    wherein obtaining, by a heuristics engine, a partial list of accessible signals comprises:
    obtaining a previously created complete list of signals accessible to the CPE in order to generate the partial list of accessible signals.

13. A method for identifying which signals provided by a head-end are accessible to a customer premise equipment (CPE) of a subscriber in a hybrid fiber coaxial network, the method comprising:
    obtaining, by a heuristics engine, a partial list of signals accessible to the CPE;
    applying, by a heuristic engine, one or more heuristic rules on the partial list of accessible signals in order to generate a complete list of signals accessible to the CPE;
    identifying other CPE of the subscriber; and
    associating the complete list of signals accessible to the CPE with the other CPE in order to generate a super-set listing of the signals accessible to each CPE.

14. A system for identifying which subset of signals provided by a head-end are accessible to a customer premise equipment (CPE) of a subscriber in a hybrid fiber coaxial (HFC) network, the system comprising:
    a heuristics engine operable to obtain a partial list of signals accessible to the CPE, and operable to apply one or more heuristic rules on the partial list of signals accessible to the CPE in order to generate a complete list of signals accessible to the CPE;
    wherein the heuristics engine obtains the partial list of signals accessible to the CPE by using signal information discovered by the CPE regarding the subset of the signals which are accessible to the CPE in order to obtain a signal identification of at least one signal accessible to the CPE, and then generates the partial list of signals accessible to the CPE based on the obtained signal identification of the at least one signal accessible to the CPE.

15. The system of claim 14 wherein:
    the discovered signal information either contains the signal identification of the at least one signal accessible to the CPE or contains information that allows creation of the signal identification of the at least one signal accessible to the CPE.

16. The system of claim 14 wherein:

the heuristics engine is operable to find any signals co-located from an output port of the head-end with the at least one signal accessible to the CPE, wherein any signal co-located with the at least one signal accessible to the CPE is also accessible to the CPE;

wherein the heuristics engine generates the partial list of signals accessible to the CPE based on the obtained signal identification of the at least one signal accessible to the CPE and any signals co-located with the at least one signal accessible to the CPE.

17. The system of claim 14 wherein:

the heuristics engine uses a bit mask within the signal identification of the at least one signal accessible to the CPE in order to identify the signal identifications of other signals which are associated with the signal identification of the at least one signal accessible to the CPE;

wherein the heuristics engine generates the partial list of signals accessible to the CPE based on the obtained signal identification of the at least one signal accessible to the CPE and the signal identifications of the other signals which are associated with the signal identification of the at least one signal accessible to the CPE.

18. The system of claim 14 wherein:

the heuristics engine uses a naming convention of the signal identification of the at least one signal accessible to the CPE in order to identify the signal identifications of other signals which are associated with the signal identification of the at least one signal accessible to the CPE;

wherein the heuristics engine generates the partial list of signals accessible to the CPE based on the obtained signal identification of the at least one signal accessible to the CPE and the signal identifications of the other signals which are associated with the signal identification of the at least one signal accessible to the CPE.

19. The system of claim 14 wherein:

the heuristics engine determines whether any other signal accessible to the CPE from a device other than the head-end has the same signal identification as the signal identification of the at least one signal accessible to the CPE in order to identify the signal identifications of other signal which have the same signal identification as the signal identification of the at least one signal accessible to the CPE;

wherein the heuristics engine generates the partial list of signals accessible to the CPE is based on the obtained signal identification of the at least one signal accessible to the CPE and the obtained signal identification of the other signals which have the same signal identification as the signal identification of the at least one signal accessible to the CPE.

20. A system for identifying which subset of signals provided by a head-end are accessible to a customer premise equipment (CPE) of a subscriber in a hybrid fiber coaxial (HFC) network, wherein the subscriber has other CPE in the HFC network, the system comprising:

a heuristics engine operable to obtain a partial list of signals accessible to the CPE, and operable to apply one or more heuristic rules on the partial list of signals accessible to the CPE in order to generate a complete list of signals accessible to the CPE; and a CPE database which stores information regarding association of the other CPE with the CPE of the subscriber;

wherein the heuristics engine is operable with the CPE database to identify the other CPE of the subscriber and then associate the complete list of signals accessible to the CPE with the other CPE in order to generate a superset listing of the signals accessible to each CPE.

* * * * *